(12) United States Patent
Ravi et al.

(10) Patent No.: US 8,368,737 B2
(45) Date of Patent: Feb. 5, 2013

(54) SMART REMOTE CONTROL DEVICES FOR CONTROLLING VIDEO CALL DEVICES

(75) Inventors: Sreekanth Ravi, Atherton, CA (US); Sudhakar Ravi, Atherton, CA (US); Jeremy Zullo, Livermore, CA (US)

(73) Assignee: Tely Labs, Inc., Menlo Park, CA (US)

( * ) Notice: Subject to any disclaimer, the term of this patent is extended or adjusted under 35 U.S.C. 154(b) by 0 days.

(21) Appl. No.: 13/470,339

(22) Filed: May 13, 2012

(65) Prior Publication Data

US 2012/0287220 A1 Nov. 15, 2012

Related U.S. Application Data

(60) Provisional application No. 61/485,229, filed on May 12, 2011, provisional application No. 61/485,233, filed on May 12, 2011, provisional application No. 61/485,237, filed on May 12, 2011.

(51) Int. Cl.
*H04N 7/14* (2006.01)
(52) U.S. Cl. ............... 348/14.05; 348/14.03; 348/14.04; 348/14.02
(58) Field of Classification Search ............... 348/14.02, 348/14.03, 14.04, 14.05, 14.01, 734; 455/420
See application file for complete search history.

(56) References Cited

U.S. PATENT DOCUMENTS

| | | | |
|---|---|---|---|
| 6,512,919 B2 | 1/2003 | Ogasawara | |
| 7,190,345 B2 * | 3/2007 | Nashida et al. ............ | 348/14.05 |
| 8,054,854 B2 * | 11/2011 | Poslinski ................... | 348/14.05 |
| 2005/0055640 A1 * | 3/2005 | Alten ........................ | 348/14.05 |
| 2009/0284577 A1 * | 11/2009 | Kumar et al. .............. | 348/14.02 |
| 2011/0085016 A1 * | 4/2011 | Kristiansen et al. ....... | 348/14.03 |
| 2011/0310796 A1 * | 12/2011 | Um et al. ................... | 348/14.04 |
| 2012/0013705 A1 | 1/2012 | Taylor et al. | |
| 2012/0050456 A1 | 3/2012 | Arnao et al. | |
| 2012/0075452 A1 | 3/2012 | Ferren | |

OTHER PUBLICATIONS

Pending U.S. Appl. No. 13/470,336 by Ravi, et al., entitled "Media Sharing During a Video Call," filed May 13, 2012.
Pending U.S. Appl. No. 13/470,337 by Ravi, et al., entitled "Wireless Network Device Configuration Using Two-Dimensional Patterns," filed May 13, 2012.
Ndje, Theodore, Office Action in U.S. Appl. No. 13/470,337, dated Aug. 1, 2012, U.S. Patent and Trademark Office, Alexandria, Virginia, US.
Ndje, Theodore, Office Action in U.S. Appl. No. 13/470,336, dated Jul. 27, 2012, U.S. Patent and Trademark Office, Alexandria, Virginia, US.

* cited by examiner

*Primary Examiner* — Stella Woo
(74) *Attorney, Agent, or Firm* — Richard A. Dunning, Jr.

(57) ABSTRACT

Apparatus having corresponding methods and non-transitory computer-readable media comprise: a transmitter configured to transmit first wireless signals to a video call device, wherein the video call device has a plurality of operating states; a receiver configured to receive second wireless signals from the video call device, wherein the second wireless signals include contextual information describing a current one of the operating states of the video call device; and a user interface configured to display an indication of the current one of the operating states of the video call device.

20 Claims, 13 Drawing Sheets

SMART REMOTE CONTROL DEVICES FOR CONTROLLING VIDEO CALL DEVICES

CROSS-REFERENCE TO RELATED APPLICATIONS

This application claims benefit of U.S. Provisional Patent Application Ser. No. 61/485,229 entitled "MEDIA SHARING DURING A VIDEO CALL," filed May 12, 2011, the disclosure thereof incorporated by reference herein in its entirety.

This application claims benefit of U.S. Provisional Patent Application Ser. No. 61/485,233 entitled "WIRELESS NETWORK DEVICE CONFIGURATION USING TWO-DIMENSIONAL PATTERNS," filed May 12, 2011, the disclosure thereof incorporated by reference herein in its entirety.

This application claims benefit of U.S. Provisional Patent Application Ser. No. 61/485,237 entitled "SMART REMOTE CONTROL DEVICES FOR VIDEO CALLING," filed May 12, 2011, the disclosure thereof incorporated by reference herein in its entirety.

This application is related to U.S. patent application Ser. No. (13/470,336), entitled "MEDIA SHARING DURING A VIDEO CALL," filed May 13, 2012, the disclosure thereof incorporated by reference herein in its entirety.

This application is related to U.S. patent application Ser. No. (13/470,337), entitled "WIRELESS NETWORK DEVICE CONFIGURATION USING TWO-DIMENSIONAL PATTERNS," filed May 13, 2012, the disclosure thereof incorporated by reference herein in its entirety.

FIELD

The present disclosure relates generally to video calling. More particularly, the present disclosure relates to the use of ancillary devices with video call devices in video calls.

BACKGROUND

Most conventional remote control devices for video call devices rely on a simple infrared remote communication device with fixed buttons and a static layout of controls. Such remote control devices are designed in such a way that they can communicate with any and all identical destination devices simultaneously. This is accomplished by broadcasting a one-way stream of data from the remote to any listening devices.

A conventional video call device normally consists of one or two video monitors, a video camera, an optional document camera, a microphone array, and an infrared (IR) remote control device. Most video call devices utilize a simple infrared remote control device. Since these remote control devices transmit button presses as broadcasts to all listening devices, they are unable to target specific video call devices to control, and also are unable to receive feedback from the video call devices.

Most modern remote control devices do not provide reconfigurable screens that are dictated by the controlled device. This means that even though a remote control device can reconfigure its display or the underlying value for each of its buttons, this reconfiguration is driven by the remote control device itself, and not by the controlled device. The reason for this is the simple one-way communication that most remote control devices have with their controlled device.

Applications that have been written for mobile electronic devices such as smart phones to replace dedicated remote control devices tend to function almost identically to the remote control devices they were meant to replace. Such applications broadcast one-way data streams from the remote control device to the controlled device, providing simple button presses that represent the buttons that would have been pressed on a dedicated remote control device. Because these simple applications are merely replacements of existing remote control devices, they tend not to take advantage of other resources that are available on the mobile electronic devices.

Current video calling solutions generally require that the cameras and microphones used during the video call be managed by the local video call device. Therefore, alternate camera feeds and audio sources can not easily be added and removed from a video call. Video call devices usually have a fixed number of cameras and microphones for use during a video call. With a static number of cameras available it can be very challenging to coordinate a collaboration session where camera and microphone placement may need to change, or the passing of control of the media streams is needed.

SUMMARY

In general, in one aspect, an embodiment features an apparatus comprising: a transmitter configured to transmit first wireless signals to a video call device, wherein the video call device has a plurality of operating states; a receiver configured to receive second wireless signals from the video call device, wherein the second wireless signals include contextual information describing a current one of the operating states of the video call device; and a user interface configured to display an indication of the current one of the operating states of the video call device.

Embodiments of the apparatus can include one or more of the following features. In some embodiments, the indication of the current one of the operating states of the video call device includes an indication of one or more commands associated with the current one of the operating states of the video call device; the user interface is further configured to allow user selection of the one or more commands; and responsive to the user selection of one of the commands, the transmitter is further configured to include an indication of the one of the commands in the first wireless signals. Some embodiments comprise a processor configured to provide media content to the transmitter; wherein, responsive to the processor providing media content to the transmitter, the transmitter is further configured to include the media content in the first wireless signals. Some embodiments comprise at least one of: a memory configured to store the media content; and one or more input devices configured to generate the media content. In some embodiments, the receiver is further configured to receive third wireless signals from a wireless device, wherein the third wireless signals include the media content. In some embodiments, the media content comprises at least one of: audio; video; and an image. Some embodiments comprise a wireless electronic device comprising the apparatus. In some embodiments, the wireless electronic device comprises at least one of: a smartphone; a feature phone; a tablet computer; a general-purpose computer; and a special-purpose computer.

In general, in one aspect, an embodiment features a method comprising: transmitting first wireless signals to a video call device, wherein the video call device has a plurality of operating states; receiving second wireless signals from the video call device, wherein the second wireless signals include contextual information describing a current one of the operating states of the video call device; and displaying an indication of the current one of the operating states of the video call device.

Embodiments of the method can include one or more of the following features. In some embodiments, the indication of the current one of the operating states of the video call device includes an indication of one or more commands associated with the current one of the operating states of the video call device; the method further comprises allowing user selection of the one or more commands; and the method further comprises including an indication of one of the commands in the first wireless signals responsive to the user selection of the one of the commands. Some embodiments comprise including the media content in the first wireless signals. Some embodiments comprise at least one of: storing the media content; and generating the media content. Some embodiments comprise receiving third wireless signals from a wireless device, wherein the third wireless signals include the media content. In some embodiments, the media content comprises at least one of: audio; video; and an image.

In general, in one aspect, an embodiment features non-transitory computer-readable media embodying instructions executable by a computer to perform functions comprising: causing transmission of first wireless signals to a video call device, wherein the video call device has a plurality of operating states; and responsive to receiving second wireless signals from the video call device, wherein the second wireless signals include contextual information describing a current one of the operating states of the video call device, displaying an indication of the current one of the operating states of the video call device.

Embodiments of the non-transitory computer-readable can include one or more of the following features. In some embodiments, the indication of the current one of the operating states of the video call device includes an indication of one or more commands associated with the current one of the operating states of the video call device; the functions further comprise allowing user selection of the one or more commands; and the functions further comprise including an indication of one of the commands in the first wireless signals responsive to the user selection of the one of the commands. In some embodiments, the functions further comprise: including the media content in the first wireless signals. In some embodiments, the functions further comprise at least one of: storing the media content; and generating the media content. Some embodiments comprise receiving the media content, wherein the media content is included in a third wireless signal sent by a wireless device. In some embodiments, the media content comprises at least one of: audio; video; and an image.

The details of one or more implementations are set forth in the accompanying drawings and the description below. Other features will be apparent from the description and drawings, and from the claims.

DESCRIPTION OF DRAWINGS

FIG. 4 shows a display for a multi-purpose control state.

FIG. 5 shows a display for an active video call devices state.

FIG. 6 shows a display for an incoming call state.

FIG. 7 shows a display for a most-recently called state.

FIG. 8 shows a display for a calling state.

Figure 1:
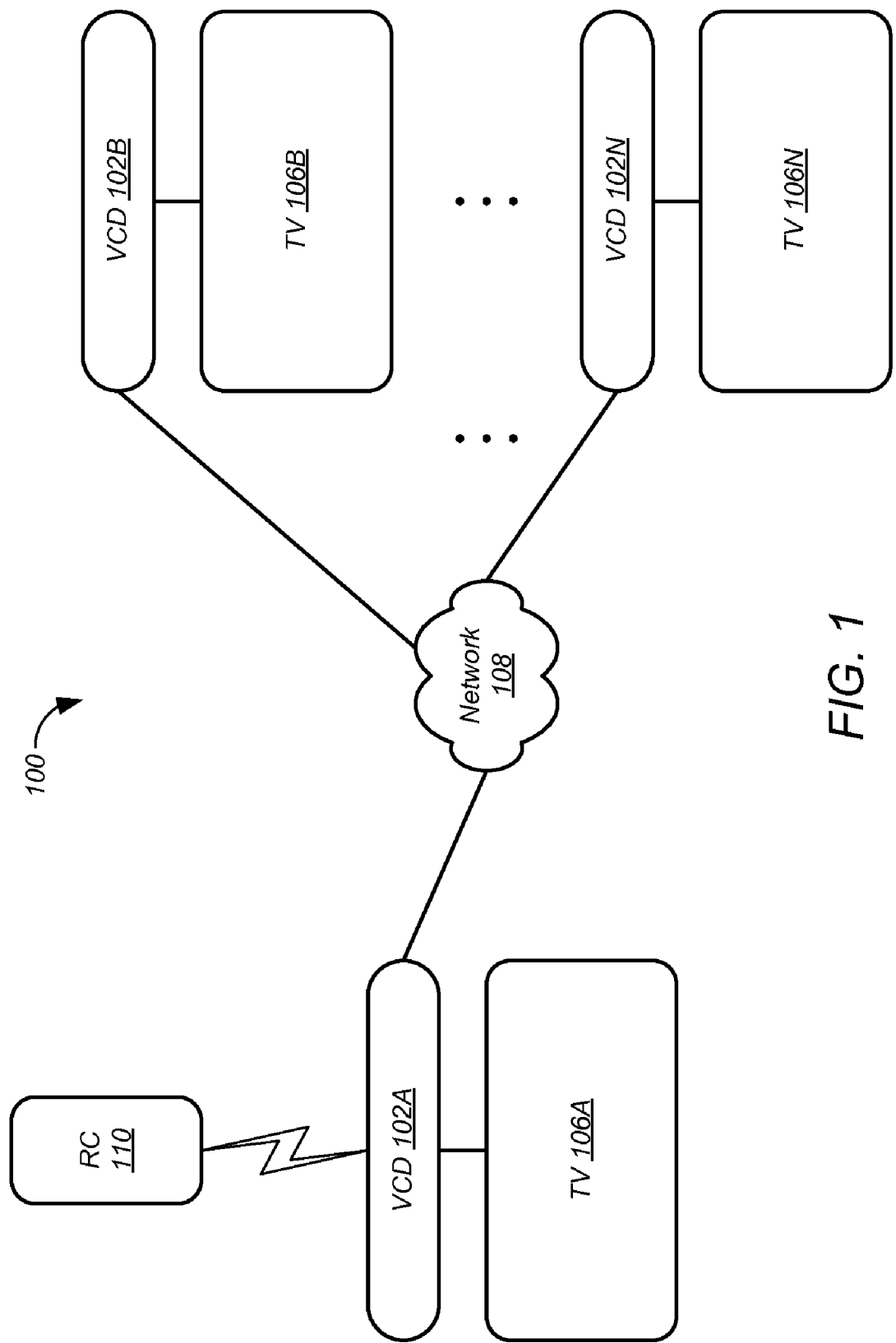
FIG. 1 shows elements of a video calling system according to one embodiment.

The leading digit(s) of each reference numeral used in this specification indicates the number of the drawing in which the reference numeral first appears.

DETAILED DESCRIPTION

The described embodiments provide ancillary electronic devices, also referred to herein as smart remote control devices, for use with video call devices in video calls. These calls are not limited to video calls, and can include voice-only or video-only calls as well. The video call devices are used for creating and conducting video calls, while the smart remote control devices can be used to provide stateful remote control device of the video call devices, as media sources to originate media content for the video calls, and as media brokers to provide media content from other devices for the video calls. The smart remote control devices also provide beaconing for simplified pairing with video call devices. Before describing the smart remote control devices, an example video call device is described.

Video Call Device

FIG. 1 shows elements of a video calling system 100 according to one embodiment. Although in the described embodiments the elements of the video calling system 100 are presented in one arrangement, other embodiments may feature other arrangements. For example, elements of the video calling system 100 can be implemented in hardware, software, or combinations thereof.

Referring to FIG. 1 the video calling system 100 includes N video call devices (video call device) 102A and 102B through 102N connected by a network 108. Network 108 can be implemented as a wide-area network such as the Internet, a local-area network (LAN), or the like. While various embodiments are described with respect to network communications, they also apply to devices employing other forms of data communications such as direct links and the like.

In the embodiment of FIG. 1, the video call devices 102 do not include display screens or speakers. Therefore each video call device 102 is connected to a respective television set (TV) 106A and 106B through 106N. In other embodiments, one or more of the video call devices 102 includes a display screen and speakers, so one or more television sets 106 are not required. In FIG. 1, each video call device 102 is controlled by one or more respective users, for example using one or more respective remote controls (RC) 110.

Figure 2:
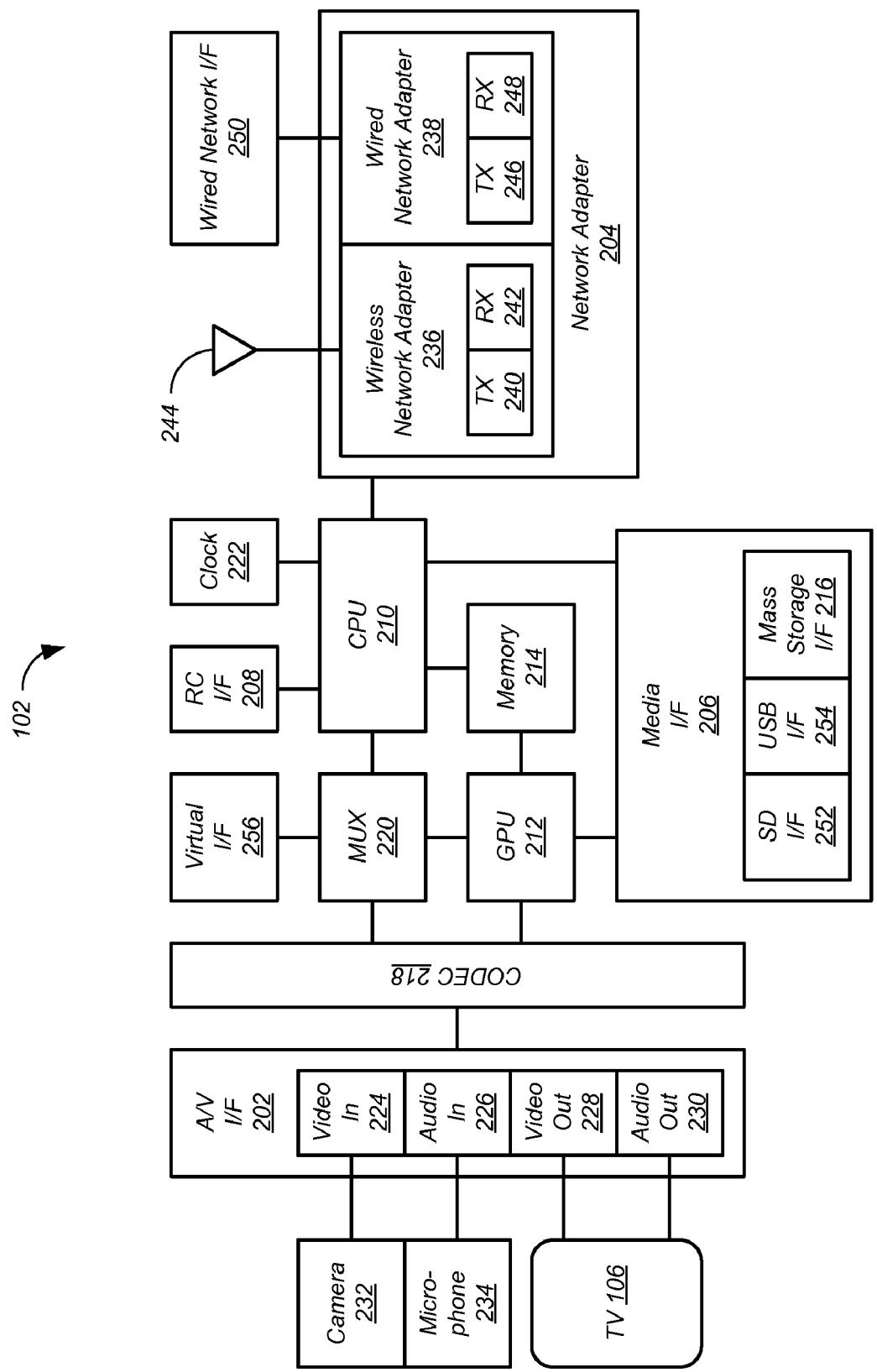
FIG. 2 shows elements of a video call device of FIG. 1 according to one embodiment.

FIG. 2 shows elements of a video call device 102 of FIG. 1 according to one embodiment. Although in the described embodiments the elements of video call device 102 are presented in one arrangement, other embodiments may feature other arrangements. For example, elements of video call device 102 can be implemented in hardware, software, or combinations thereof.

Referring to FIG. 2, the video call device 102 includes an audio-visual (AV) interface (I/F) 202, a network adapter 204, a media interface 206, and a remote control (RC) interface 208. The video call device 102 also includes a processor or central processing unit (CPU) 210, a graphical processing unit (GPU) 212, a memory 214, a coder/decoder (CODEC) 218, a multiplexer (MUX) 220, and a clock 222.

The AV interface 202 includes a video input interface (Video In) 224, an audio input interface (Audio In) 226, a video output interface (Video Out) 228, and an audio output interface (Audio Out) 230. The video input interface 224 can be connected to one or more video capture devices such as a camera 232 or the like. Camera 232 can be implemented as a wide-angle camera that sees the whole room. The audio input interface 226 can be connected to one or more audio capture device such as a microphone 234 or the like. Microphone 234 can be implemented as a noise-cancelling microphone. In some embodiments, video call device 102 includes one or more cameras 232 and/or one or more microphones 234. For example, multiple cameras 232 can be included to generate three-dimensional (3D) video. As another example, multiple microphones 234 can be included so that beamforming techniques can be used to isolate conversations from background noise.

The video output interface 228 can be connected to a display screen such as that of a television set 106. The audio output interface 230 can be connected to one or more speakers such as those of a television set 106. Alternatively, the video output interface 228 and/or the audio output interface 230 can be connected to the audio-visual inputs of a home theater system or the like. The video output interface 228 and the audio output interface 230 can employ any appropriate connection, for example such as Digital Visual Interface (DVI), High-Definition Multimedia Interface (HDMI), and the like.

The network adapter 204 includes a wireless network adapter 236 and a wired network adapter 238. In some embodiments, network adapter 204 includes additional communication interfaces, for example including Bluetooth communication interfaces and the like.

The wireless network adapter 236 includes a transmitter (TX) 240 to transmit wireless signals and a receiver (RX) 242 to receive wireless signals, and is connected to one or more antennas 244. In some embodiments, wireless network adapter 236 is compliant with all or part of IEEE standard 802.11, including draft and approved amendments such as 802.11-1997, 802.11a, 802.11b, 802.11g, 802.11-2007, 802.11n, 802.11-2012, and 802.11ac. For example, the wireless network adapter 236 can allow Wi-Fi connections, for example to a router, to other Wi-Fi devices such as smartphones and computers, and the like.

The wired network adapter 238 includes a transmitter (TX) 246 to transmit wired signals and a receiver (RX) 248 to transmit wired signals, and is connected to a wired network interface 250. In some embodiments, wired network adapter 238 is compliant with all or part of IEEE standard 802.3, including draft and approved amendments.

The disclosed video call devices 102 are capable of peer-to-peer (P2P) audio/video communication. Using P2P technology, two video call devices 102 can be connected to each other by one or more networks such that data packets can flow between them. The video call devices 102 can be located anywhere in the world, so long as they are connected by networks 108 such as the Internet. The video call devices 102 can employ multiple communication channels between participants. One channel carries the primary video stream of the video call. Another channel carries the primary audio stream of the video call. A command channel carries commands such as camera commands (for example, pan, tilt, and zoom) and the like. The command channel can also carry synchronization commands to ensure synchronized media playback across multiple sites. Additional channels can employed for other tasks such as media sharing and the like.

Some available P2P technologies provide multiple communication channels for each video call device 102. The video call device 102 can employ the provided channels and/or channels established outside the chosen P2P technology. P2P technologies generally provide network address translation (NAT) traversal for their channels. The video call devices 102 described herein can provide NAT traversal for channels established outside the chosen P2P technology.

The media interface 206 receives local media content from external sources, and provides that media content to one or both of processors 210 and 212. In the embodiment of FIG. 2, the media interface 206 includes a Secure Digital (SD) interface 252, a Universal Serial Bus (USB) interface 254, and a mass storage interface 216. Other embodiments can include other interfaces.

The SD interface 252 receives SD cards, and provides media content stored thereon to the CPU 210 and the GPU 212. The USB interface 254 receives USB devices such as USB memory sticks, USB-cabled devices, and the like, and provides media content from those devices to the CPU 210 and the GPU 212. The USB interface 254 can also receive input devices such as USB dongles for wireless keyboards, wireless pointing devices, and the like. The mass storage interface 216 allows for connection to mass storage devices such as external solid-state drives, disk drives, and the like, and provides media content stored thereon to the CPU 210 and the GPU 212.

The remote control (RC) interface 208 receives wireless signals such as infrared signals from remote control devices for controlling the video call device 102. In some embodiments, the video call device 102 can be controlled by a wireless device via the wireless network adapter 236.

The CPU 210 handles general processing functions, while the GPU 212 handles graphic processing functions. In some embodiments, the CPU 210 handles graphic processing functions as well, so the GPU 212 is not required. The CPU 210 receive a time base from clock 222. The memory 214 can be implemented as semiconductor memory and the like.

The CODEC 218 provides encoding, decoding, and transcoding of the audio and video data handled by the video call device 102. In some embodiments, the CODEC 218 is compliant with one or more standards such as the H.264 standard and the like.

The MUX 220 allows audio and video to be exchanged via the A/V interface 202, a virtual interface 256, or both. The MUX 220 allows any of the inputs and outputs to be switched with virtual inputs and outputs. For example, audio and video can be provided to and/or from other local devices such as smartphones, portable cameras, document cameras, computer displays of external computers, and the like.

Smart Remote Control Device

Figure 3:
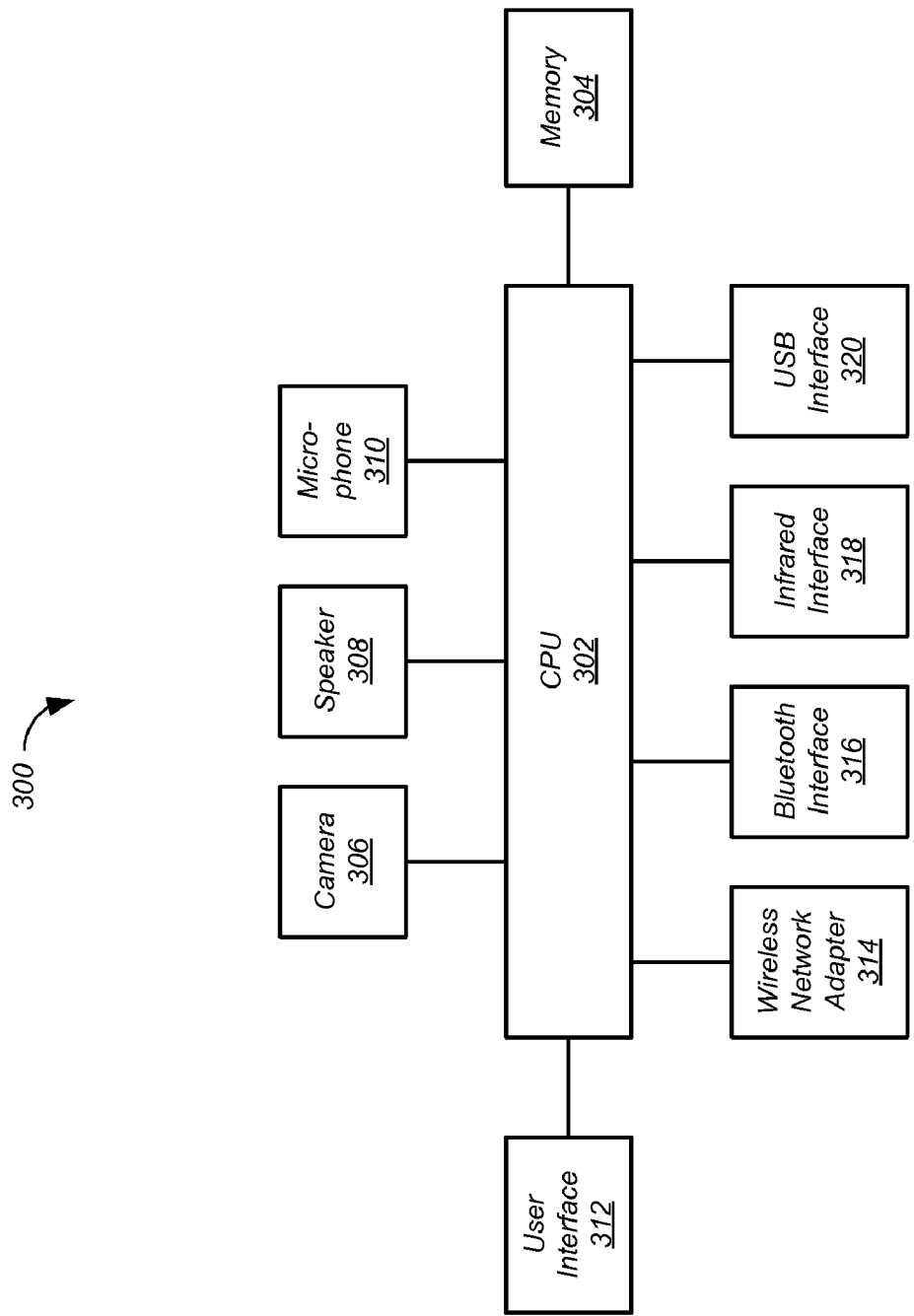
FIG. 3 shows elements of a smart remote control device according to one embodiment.

FIG. 3 shows elements of a smart remote control device 300 according to one embodiment. Although in the described embodiments the elements of the smart remote control device 300 are presented in one arrangement, other embodiments may feature other arrangements. For example, elements of the smart remote control device 300 can be implemented in hardware, software, or combinations thereof. For example, the smart remote control device 300 can be implemented as smartphones, tablets, general purpose computers, specialized devices, and the like. The smart remote control device 300 can be used in place of the remote control device 110 to control the video calling device 102A of FIG. 1.

Referring to FIG. 3, the smart remote control device 300 includes a processor or central processing unit (CPU) 302, a memory 304, a camera 306, a speaker 308, a microphone 310, and a user interface 312, which can include touch screens, trackballs, rocker switches, buttons, and the like. The smart remote control device 300 also includes wireless communication interfaces such as a wireless network adapter 314, a Bluetooth (BT) interface 316, an infrared (IR) interface 318. The smart remote control device 300 also includes wired communication interfaces such as a USB interface 320. In other embodiments, smart remote control device can include other wired and wireless communication interfaces such as a near field communication (NFC) interface, an SD card interface, and the like. The smart remote control device 300 can use any of these communication interfaces to communicate with video call devices 102, with other smart remote control devices 300, and with other electronic devices such as personal computers and the like. In some embodiments, wireless network adapter 314 is compliant with all or part of IEEE standard 802.11, including draft and approved amendments such as 802.11-1997, 802.11a, 802.11b, 802.11g, 802.11-2007, 802.11n, 802.11-2012, and 802.11ac.

Beaconing for Simplified Pairing with Video Call Devices

By leveraging networking and sensor arrays, the disclosed smart remote control devices 300 can intelligently detect the most logical video call devices 102 to pair with at start up. The user is also allowed to override the default choice, and can choose the particular video call device 102 to pair with the smart remote control device 300. Beaconing is used to automatically detect the best video call devices 102 to pair with. If the user of the smart remote control device 300 is in a situation where a more ideal video call device 102 is detected, for example if the user walks into a different room with a different video call device 102, then the smart remote control device 300 will allow the user to re-pair with the new video call device 102. This allows for a single smart remote control device 300 to fluidly flow between many video call devices 102 and video calls.

The disclosed smart remote control devices 300 can use their onboard sensors and communication devices alone or in any combination to detect video call devices 102 to pair with. The smart remote control devices 300 can employ a best effort approach to select a video call device 102 for pairing. For example, a smart remote control device 300 can send network broadcasts and receive responses from the video call devices 102 to identify all available video call devices 102. If the smart remote control device 300 receives multiple responses, the smart remote control device 300 can command the video call devices 102 to transmit further information. For example, if the video call devices 102 include a piezoelectronic device as a ringer, the smart remote control device 300 can command the video call devices 102 to transmit ultrasonic signals, and can measure the signal strength of the signals to identify the closest video call device 102. Other examples include the use of signals including Bluetooth signals, near field communication (NFC) signals, infrared pulses, GPS, human-audible pulses, and the like. In addition, several smart remote control devices 300 can pair with a single video call device 102.

Stateful Remote Control of Video Call Devices

The disclosed smart remote control devices 300 enable stateful control of video call devices 102 including visual feedback and multiple input modes (including touch screen, gestures, virtual keyboard, virtual mouse, voice recognition and the like). The described smart remote control devices 300 also provide dynamic instrumentation screens. The video call device 102 provides contextual information to the smart remote control device 300 about the current state of the video call device 102. The smart remote control device 300 uses this feedback stream to modify the user's experience by reconfiguring the screen and available options of the smart remote control device 300 to show only the most relevant choices. The display format may change based on the type of data to be input, such as a text string, a number, or a graphical list of contacts, etc. The display may also change based on the current mode of the system. For example, if the video call device 102 is currently in a call, the video and audio streams can be rendered on the smart remote control device 300 as well.

The smart remote control device 300 software can be updated based on the version of the paired video call device 102. So if a smart remote control device 300 pairs with an older video call device 102, the smart remote control device 300 can automatically configure its software to the version of the video call device 102 to remain compatible with all versions of the video call devices 102 even in a heterogeneous video conferencing environment.

FIGS. 4-8 show displays shown by a smart remote control device 300 for five different states according to one embodiment. Of course, other states are contemplated. The displays of FIGS. 4-8 are intended for a smart remote control device 300 having a touch screen. Other displays can be used for devices lacking a touch screen.

Figure 4:
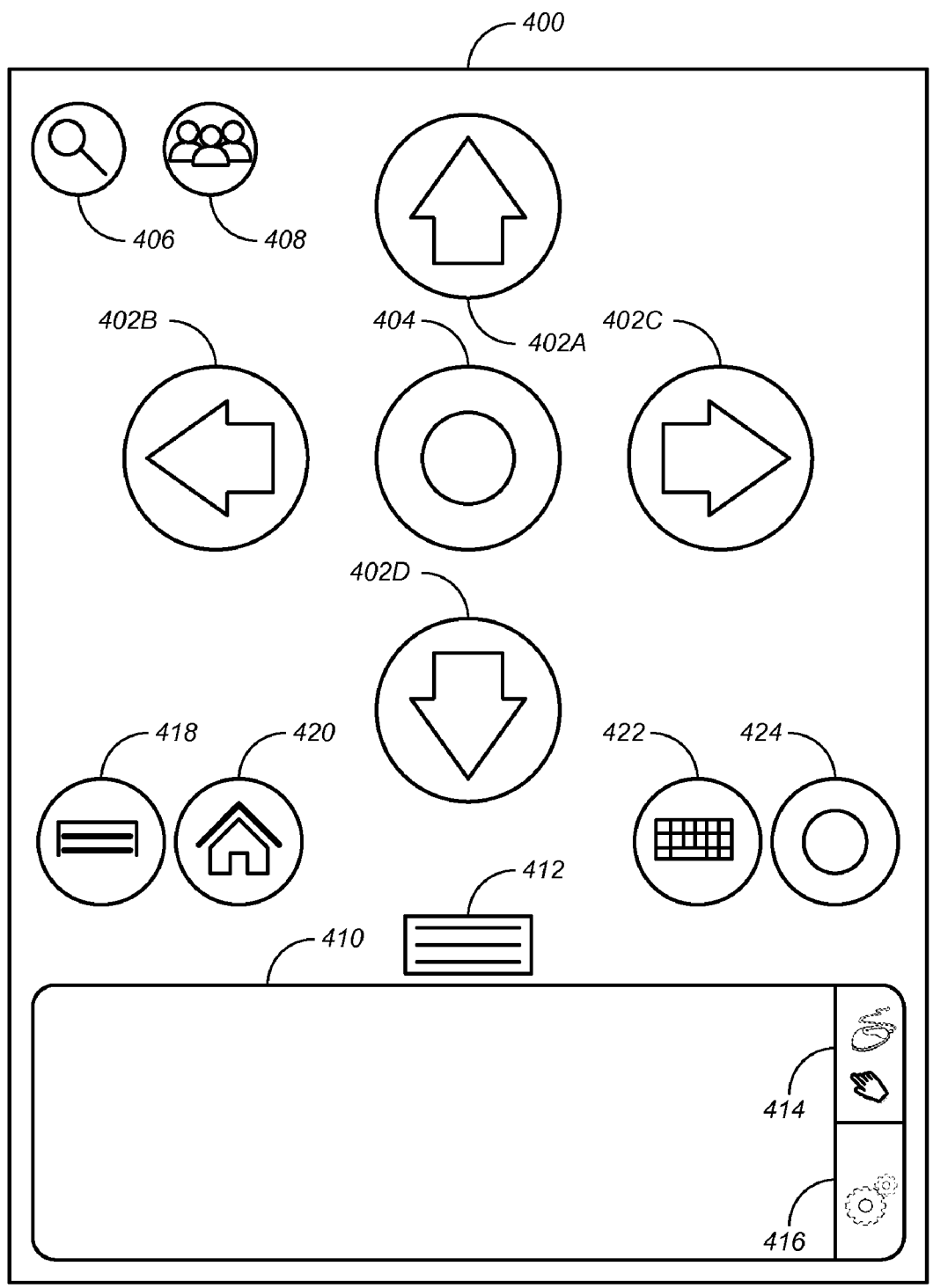
FIGS. 4-8 show displays shown by a smart remote control device for five different states according to one embodiment.

FIG. 4 shows a display 400 for a multi-purpose control state. The multi-purpose control state display 400 includes four directional control buttons 402A,B,C,D and a confirmation button 404. The multi-purpose control state display 400 also includes a search button 406 and a contacts button 408. The search button 406 allows a user to search contacts, for example by creating an ever-refining filter. The contacts button 408 allows a user to pick a contact from a list of recently-accessed contacts.

At the bottom of the multi-purpose control state display 400 is a touchpad 410 accompanied by a thumb widget 412 that allows a user to change the size of touchpad 410 by dragging the thumb widget 412. To the right of the touchpad 410 are a mouse button 414 and a gears button 416. The mouse button 414 toggles a virtual mouse state. In the virtual mouse state, gestures on the touchpad 410 control a mouse cursor on the display device connected to the video call device 102 being controlled by the smart remote control device 300. The gears button 416 changes the state of the smart remote control device 300 to a connection state where a user can choose the video call device 102 to be controlled by the smart remote control device 300.

Above the touchpad 410 are a menu button 418, a home button 420, a keyboard button 422, and a hang-up/back button 424. The menu button 418 changes the state of the smart remote control device 300 to a menu state where a menu of options is displayed. The home button 420 changes the state of the smart remote control device 300 to a home state where a home screen is displayed. The keyboard button 422 toggles an on-screen keyboard state. The hang-up/back button 424 can be used to end a video call or to return to a previous state.

Figure 5:
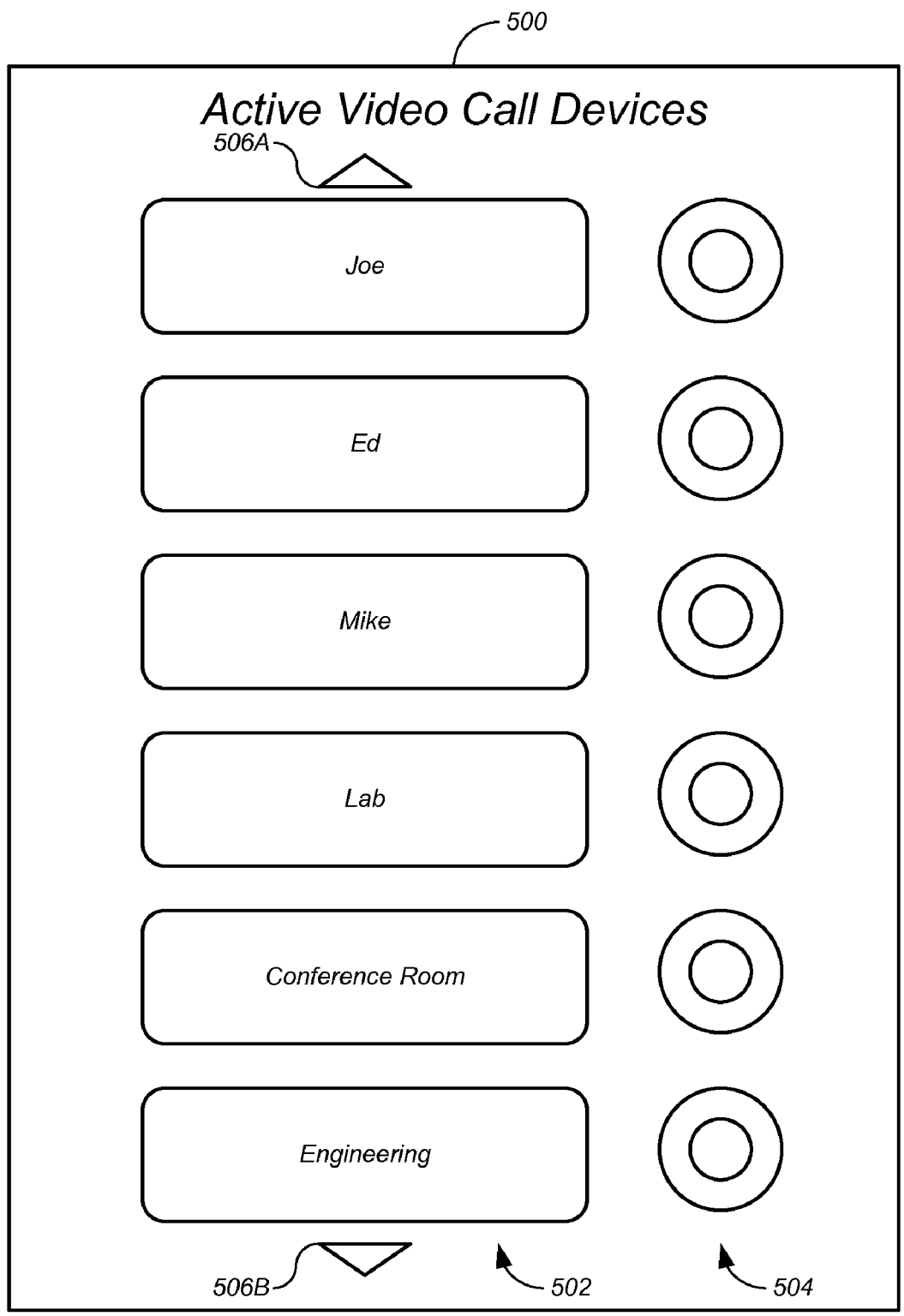

FIG. 5 shows a display 500 for an active video call devices state. The active video call devices state display 500 lists the video call devices 102 that are active, and allows a user to call one or more of the listed video call devices 102, add one or more of the listed video call devices 102 to an ongoing video call, and disconnect from one or more of the listed video call devices 102. Each video call device 102 can be assigned a name. The video call devices 102 are listed by name at 502. At 504, next to each name is a button for calling or disconnecting the respective video call device 102. The appearance of each button 504 indicates whether the video call device 102 is part of the current video call. For example, the button next to the video call device name "Engineering" is cross-hatched, indicating that video call device 102 is part of the current video call. If the list is too long to display, scroll buttons appear at 506A,B for scrolling the list.

Figure 6:
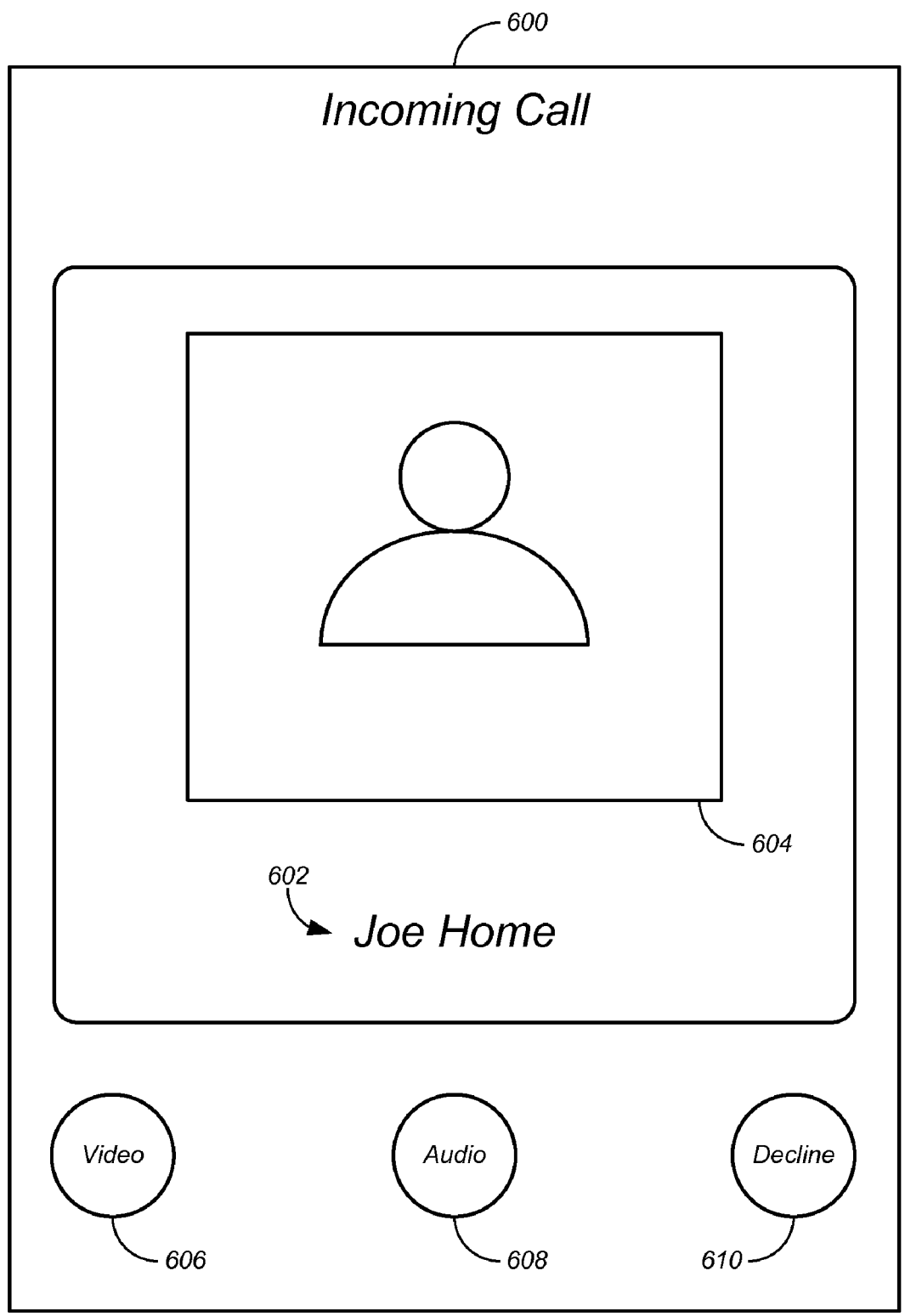

FIG. 6 shows a display 600 for an incoming call state. The incoming call state display 600 is shown when the controlled smart remote control device 300 receives an incoming call. The incoming call state display 600 shows the name of the calling video call device 102 at 602, and a photo or avatar of the caller at 604. The incoming call state display 600 also shows a video button 606, an audio button 608, and a decline button 610. The video button 606 allows the user to accept the call as a video call. The audio button 608 allows the user to accept the call as an audio call with no video. The decline button 610 allows the user to decline the call.

Figure 7:
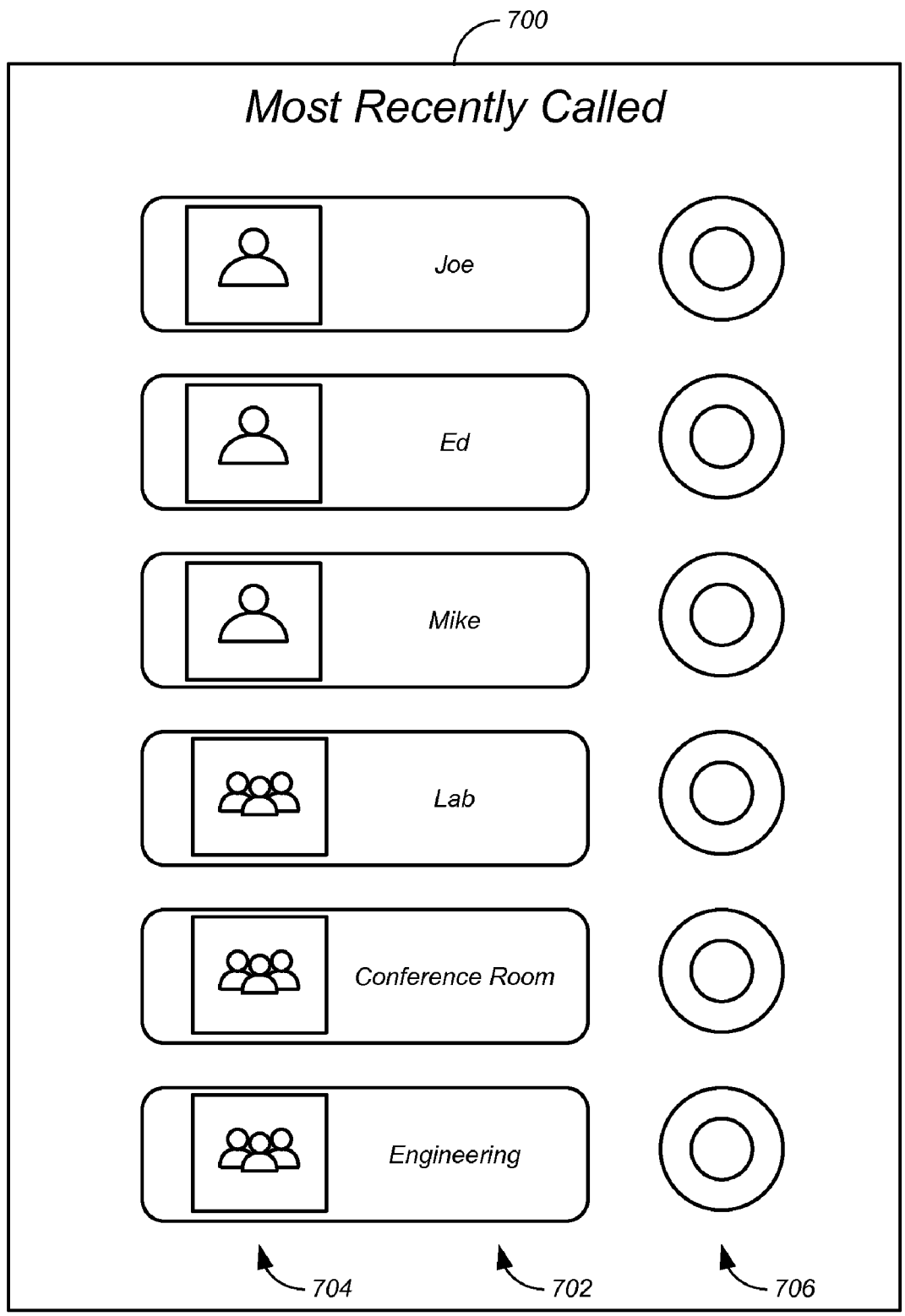

FIG. 7 shows a display 700 for a most-recently called state. The most-recently called state display 700 lists the most-recently-called video call devices 102, and allows a user to call one or more of the listed video call devices 102, to add one or more of the listed video call devices 102 to an ongoing video call, and to disconnect from one or more of the listed video call devices 102. The video call devices 102 are listed by name at 702 with an associated photo or avatar at 704. At 706, next to each name is a button for calling or disconnecting the respective video call device 102. If the list is too long to display, scroll buttons appear for scrolling the list. The most-recently-called state can be accessed from the multi-purpose control state display 400 of FIG. 4 by selecting the contacts button 408.

Figure 8:
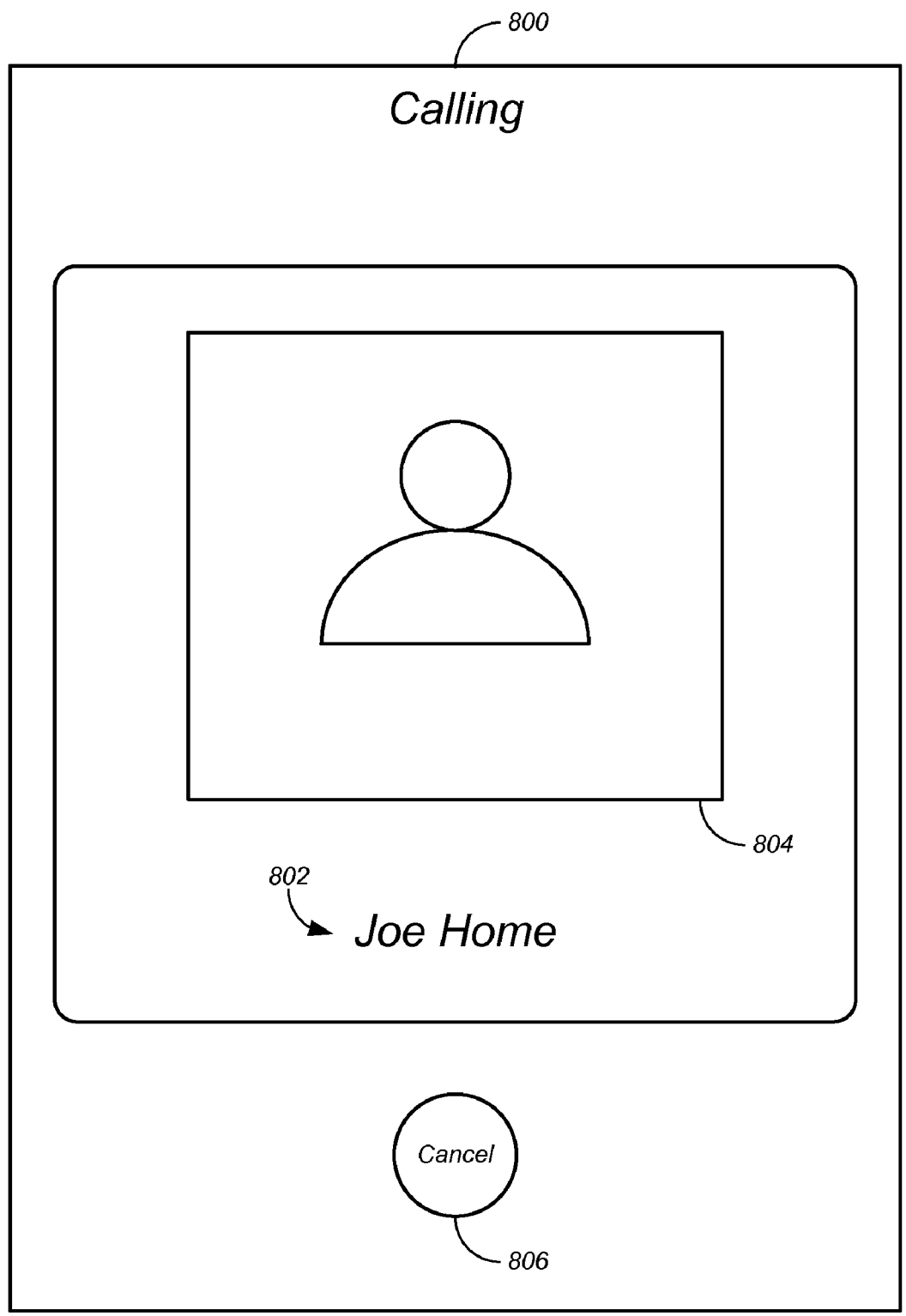

FIG. 8 shows a display 800 for a calling state. The calling state display 800 is shown when the controlled smart remote control device 300 is placing an outgoing call. The calling state display 800 shows the name of the video call device 102 being called at 802, and an associated photo or avatar at 804. The calling state display 800 also shows a cancel button 806, which can be operated to cancel the call.

Figure 9:
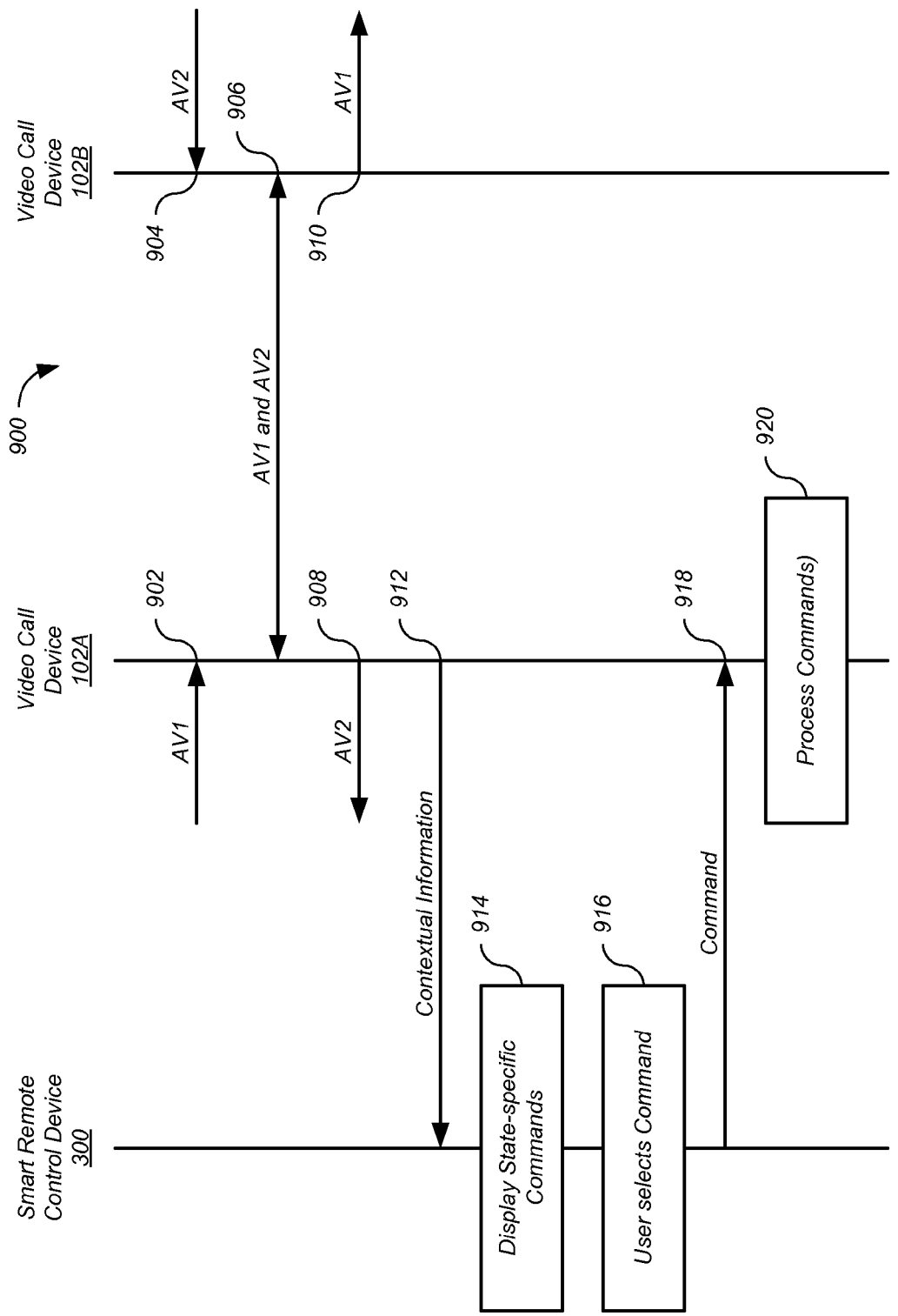
FIG. 9 shows a process for the video calling system of FIG. 1 according to an embodiment where a smart remote control device provides stateful control of a first video call device during a video call with a second video call device.

FIG. 9 shows a process 900 for the video calling system 100 of FIG. 1 according to an embodiment where a smart remote control device 300 provides stateful control of a first video call device 102A during a video call with a second video call device 102B. Although in the described embodiments the elements of process 900 are presented in one arrangement, other embodiments may feature other arrangements. For example, in various embodiments, some or all of the elements of process 900 can be executed in a different order, concurrently, and the like. Also some elements of process 900 may not be performed, and may not be executed immediately after each other. For clarity, only one smart remote control device 300 and two video call devices 102A,B are shown in FIG. 9. However, it should be understood that more than one smart remote control device 300, and/or more than two video call devices 102, can participate in process 900. In addition, while the embodiment of FIG. 9 employs stateful control of a video call device 102 during a video call, it should be understood that such stateful control can be employed outside of a video call as well.

Referring to FIG. 9, the video call devices 102A,B conduct a video call. In particular, the first video call device 102A receives first audio information and first video information AV1 at 902, for example from a local camera 232 and microphone 234. The second video call device 102B receives second audio information and second video information AV2 at 904. The video call devices 102A,B exchange the first and second audio and video information AV1 and AV2 at 906. The first video call device 102A renders the second audio and video information AV2 at 908, for example on television set 106A. The second video call device 102B renders the first audio and video information AV1 at 910, for example on television set 106B. This exchange can continue for the remainder of process 900.

At 912, the first video call device 102A provides contextual information to the smart remote control device 300. The contextual information indicates an operating state of the video call device 102A. The operating states of the video call devices 102 can include any operating state, for example including the states described with reference to FIGS. 4-8.

In response to receiving the contextual information, at 914 the smart remote control device 300 displays state-specific information. For example, in response to the contextual information indicating an incoming call state for the video call device 102A, the smart remote control device 300 shows display 600 of FIG. 6 for an incoming call state. The state-specific display can includes state-specific commands. For the incoming call state, the commands can include the commands represented by the video button 606, the audio button 608, and the decline button 610. At 916 the user selects one of the commands, for example by touching one of the buttons 606, 608, and 610. Responsive to the user selecting a command button, the smart remote control device 300 sends the corresponding command to the video call device 102A at 918. Responsive to receiving the command, the video call device 102A processes the command at 920. For example, responsive to receiving the command associated with the user touching the video button 606, the video call device 102A accepts the incoming call as a video call.

Media Content Source and Broker

Figure 10:
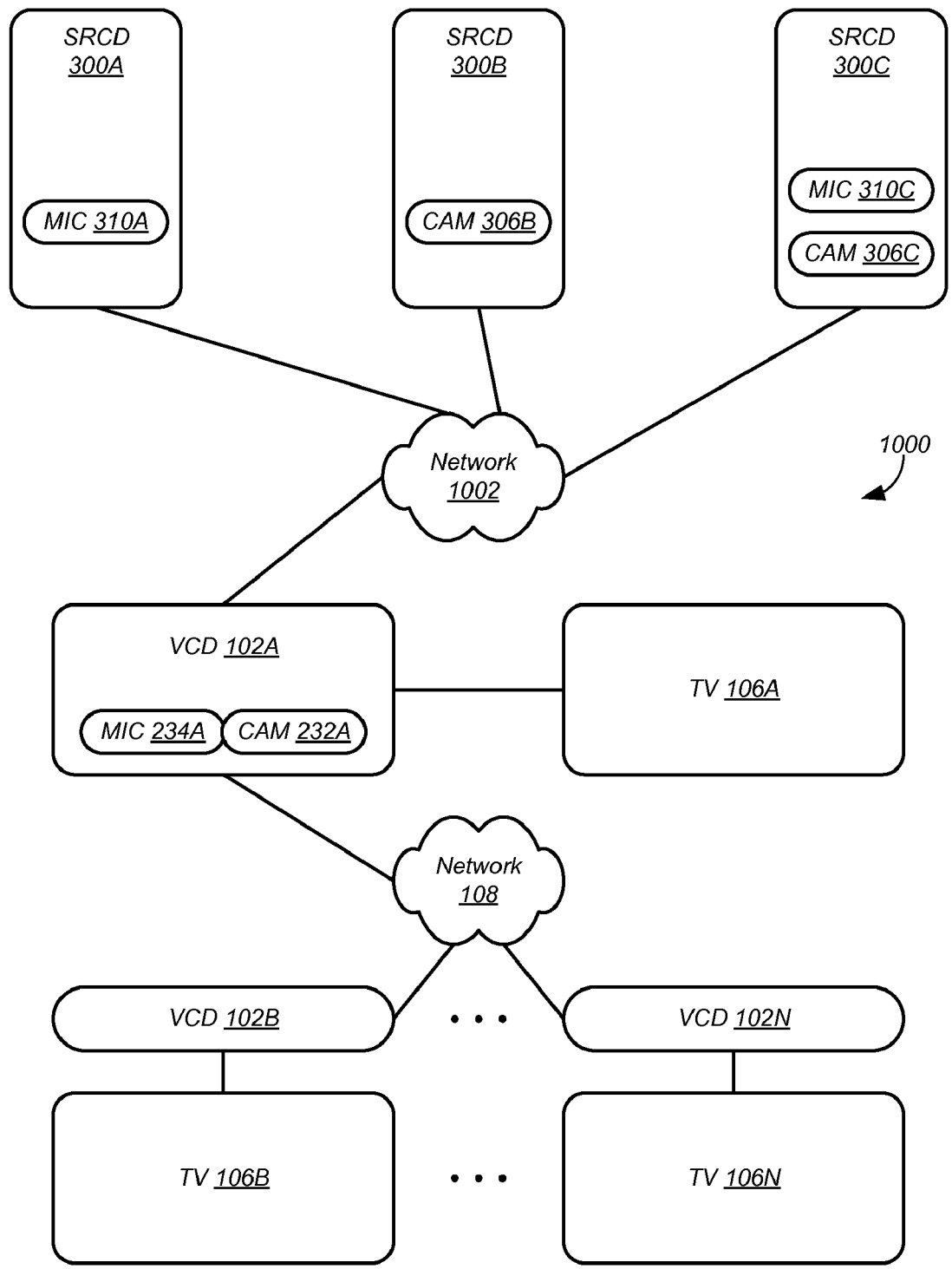
FIG. 10 shows a video calling system where three smart remote control devices act as media content sources for a video call device while the video call device is engaged in a video call according to one embodiment.

The disclosed smart remote control devices 300 can act as media content sources and brokers. FIG. 10 shows a video calling system 1000 where three smart remote control devices (SRCD) 300A,B,C act as media content sources for a video call device (VCD) 102A while the video call device 102A is engaged in a video call according to one embodiment. Although in the described embodiments the elements of the video calling system 1000 are presented in one arrangement, other embodiments may feature other arrangements. For example, elements of the video calling system 1000 can be implemented in hardware, software, or combinations thereof.

Referring to FIG. 10, the smart remote control devices 300A,B,C communicate with the video call device 102A over a local network 1002 such as a WiFi local area network. Video call device 102A is engaged in a video call with one or more other video call devices 102B-N over a network 108 such as the Internet.

In FIG. 10, the smart remote control devices 300A,B,C share media content with the video call device 102A during a video call between the video call device 102A and one or more other video call devices 102B-N, thereby enabling the video call device 102A to share that media content with the other video call devices 102B-N. However, the smart remote control devices 300A,B,C can share media content with the video call device 102A outside a video call, for example to support local collaboration. For example, a group of engineers in a conference room can use their local video call device 102A to collaborate using the attached TV set 106A.

In FIG. 10, a first smart remote control device 300A shares its microphone (MIC) 310A, a second smart remote control device 300B shares its camera (CAM) 306B, while a third smart remote control device 300C shares both its camera 306C and microphone 310C. The video call device 102A shares its camera 232A and microphone 234A as well. The video call device 102A renders the shared media content on TV set 106A, and provides the shared media content to the other video call devices 102B-N in the video call, which render the shared media content on TV sets 106B-N. Sharing media content during a video call is disclosed in U.S. Provisional Patent Application Ser. No. 61/485,229 entitled "MEDIA SHARING DURING A VIDEO CALL," filed May 12, 2011, and U.S. patent application Ser. No. (to be assigned), entitled "MEDIA SHARING DURING A VIDEO CALL," filed TBD, the disclosures thereof incorporated by reference herein in their entirety.

Figure 11:
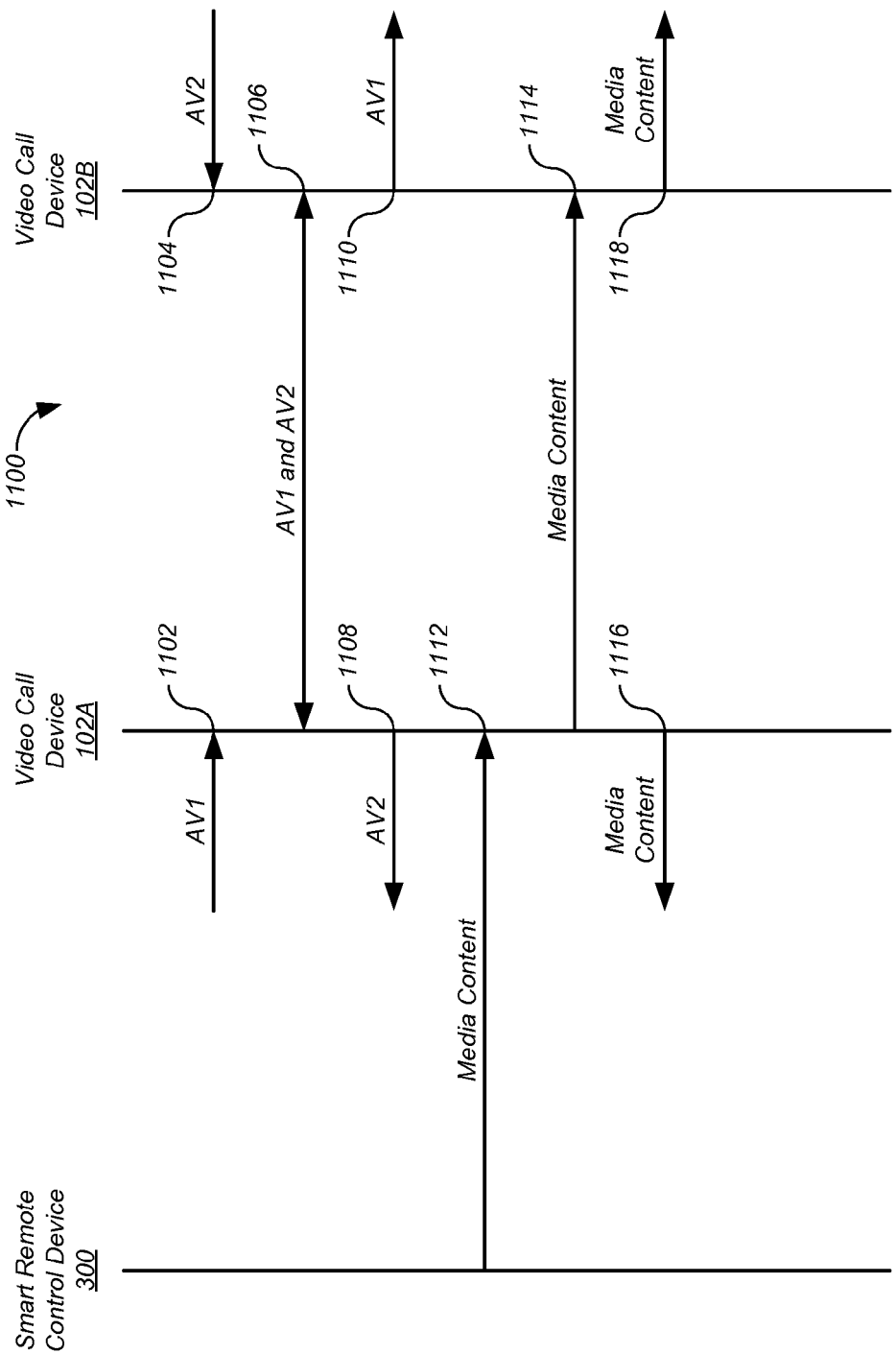
FIG. 11 shows a process for the video calling system of FIG. 10 according to an embodiment where a smart remote control device acts as a media content source for a first video call device during a video call with a second video call device.

FIG. 11 shows a process 1100 for the video calling system 1000 of FIG. 10 according to an embodiment where a smart remote control device 300 acts as a media content source for a first video call device 102A during a video call with a second video call device 102B. Although in the described embodiments the elements of process 1100 are presented in one arrangement, other embodiments may feature other arrangements. For example, in various embodiments, some or all of the elements of process 1100 can be executed in a different order, concurrently, and the like. Also some elements of process 1100 may not be performed, and may not be executed immediately after each other. For clarity, only one smart remote control device 300 and two video call devices 102A,B are shown in FIG. 11. However, it should be understood that more than one smart remote control device 300, and/or more than two video call devices 102, can participate in process 1100. In addition, while in the embodiment of FIG. 11 the smart remote control device 300 acts as a media source during a video call, it should be understood that the smart remote control device 300 can act as a media source outside of a video call as well.

Referring to FIG. 11, the video call devices 102A,B conduct a video call. In particular, the first video call device 102A receives first audio information and first video information AV1 at 1102, for example from a local camera 232 and microphone 234. The second video call device 102B receives second audio information and second video information AV2 at 1104. The video call devices 102A,B exchange the first and second audio and video information AV1 and AV2 at 1106. The first video call device 102A renders the second audio and video information AV2 at 1108, for example on television set 106A. The second video call device 102B renders the first audio and video information AV1 at 1110, for example on television set 106B. This exchange can continue for the remainder of process 1100.

At 1112, the smart remote control device 300 provides media content to the first video call device 102A. The media content can be any sort of media content. For example, the media content can be generated by the camera 306 and microphone 310 of the smart remote control device 300, received by the smart remote control device 300 over a communication interface, retrieved from the memory 304 of the smart remote control device 300, or the like. At 1114, the first video call device 102A sends the media content to the second video call device 102B. While the media content is being transferred, the displays at both ends of the video call can show the status of the transfer.

The video call devices 102 render the media content. In particular, video call device 102A renders the media content on TV set 106A at 1116, and video call device 102B renders the media content on TV set 106B at 1118. In some embodiments, the rendering of the media content is synchronized, for example through the exchange of synchronization commands, so that the video call devices 102 render the media content at the same time. For example, the video call devices 102 can render a photo simultaneously. As another example, the video call devices 102 can begin playback of a video file simultaneously. Such synchronization is described in U.S. Provisional Patent Application Ser. No. 61/485,229 entitled "MEDIA SHARING DURING A VIDEO CALL," filed May 12, 2011, and U.S. patent application Ser. No. (to be assigned), entitled "MEDIA SHARING DURING A VIDEO CALL," filed TBD, the disclosures thereof incorporated by reference herein in their entirety.

As media content sources, the described embodiments allow users to take advantage of existing smart phones, tablets, and multimedia-capable computers, and to make these resources available to participants in a video call. Resources on the smart remote control device 300 can be utilized as if they were local resources of the video call device 102, for example by using the virtual interface 256 of the video call device 102. Such resources can include, for example, wireless microphones, wireless speakers, video playback, cameras, camera functions, web page views, orientation sensors, GPS, wireless management of remote devices, touch screens, pointing devices, high resolution displays, high speed networking, video decoders, video encoders, audio recording, audio playback, web browsing, and the like.

Figure 12:
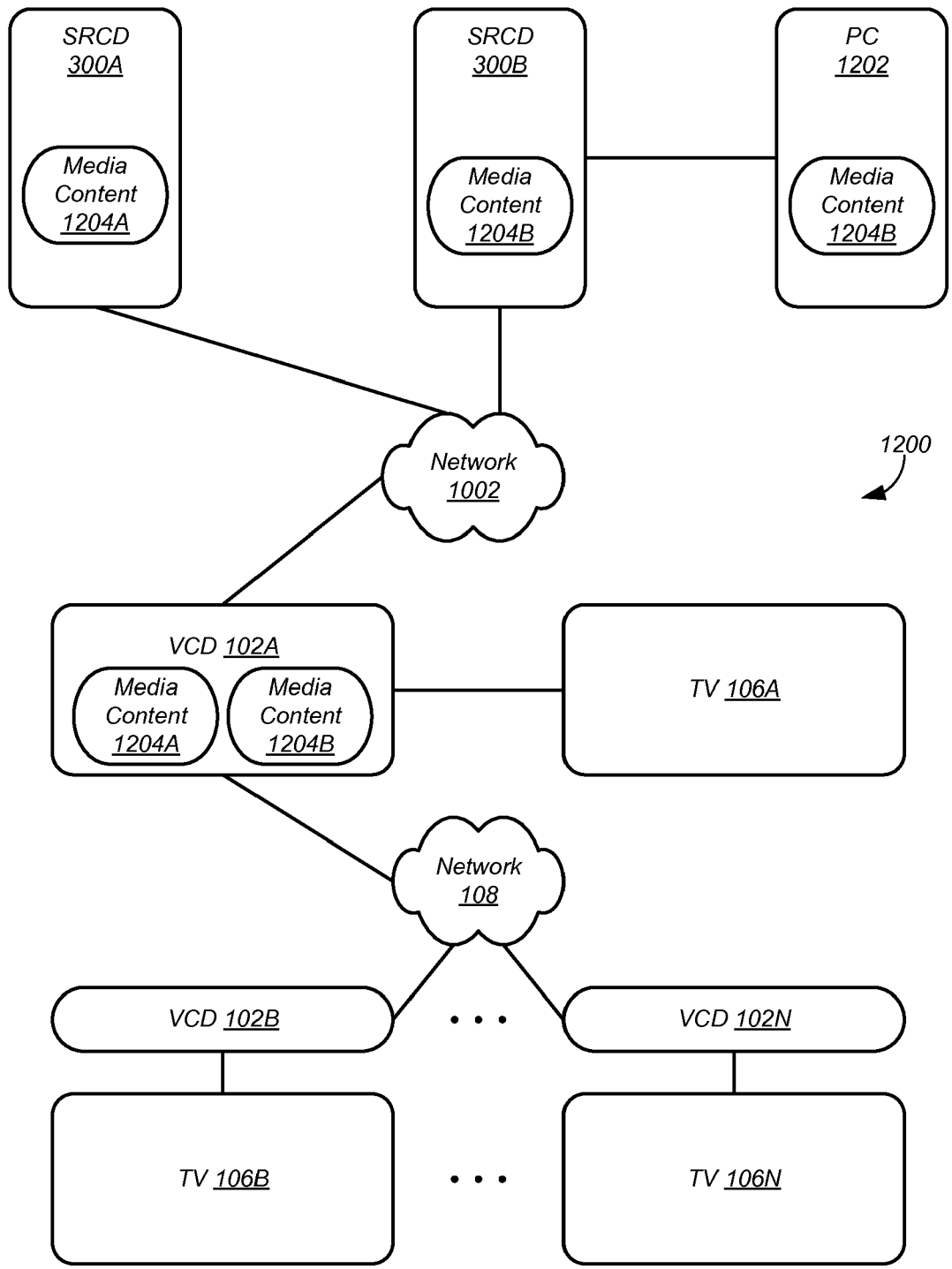
FIG. 12 shows a video calling system where one smart remote control device acts as a media content source for a video call device and another smart remote control device acts as a media content broker while the video call device is engaged in a video call according to one embodiment.

FIG. 12 shows a video calling system 1200 where one smart remote control device (SRCD) 300A acts as a media content source for a video call device (VCD) 102A and another smart remote control device 300B acts as a media content broker while the video call device 102A is engaged in a video call according to one embodiment. Although in the described embodiments the elements of the video calling system 1200 are presented in one arrangement, other embodiments may feature other arrangements. For example, elements of the video calling system 1200 can be implemented in hardware, software, or combinations thereof.

Referring to FIG. 12, the smart remote control devices 300A,B communicate with the video call device 102A over a local network 1002 such as a WiFi local area network. Video call device 102A is engaged in a video call with one or more other video call devices 102B-N over a network 108 such as the Internet.

In FIG. 12, smart remote control device 300A,B share and broker media content with the video call device 102A during a video call between the video call device 102A and one or more other video call devices 102B-N, thereby enabling the video call device 102A to share that media content with the other video call devices 102B-N. However, the smart remote control devices 300A,B can share and broker media content with the video call device 102A outside a video call, for example to support local collaboration.

In FIG. 12, a first smart remote control device 300A shares media content 1204A with video call device 102A, for example as described with reference to FIGS. 10 and 11. A second smart remote control device 300B brokers media content 1204B to video call device 102A from a personal computer 1202. That is, smart remote control device 300B obtains media content 1204B from the personal computer 1202, and shares that media content 1204B with video call device 102A, for example as described with reference to FIGS. 10 and 11. The video call devices 102A,B-N render the shared media content 1204A and the brokered media content 1204B on the respective TV sets 106A,B-N.

Figure 13:
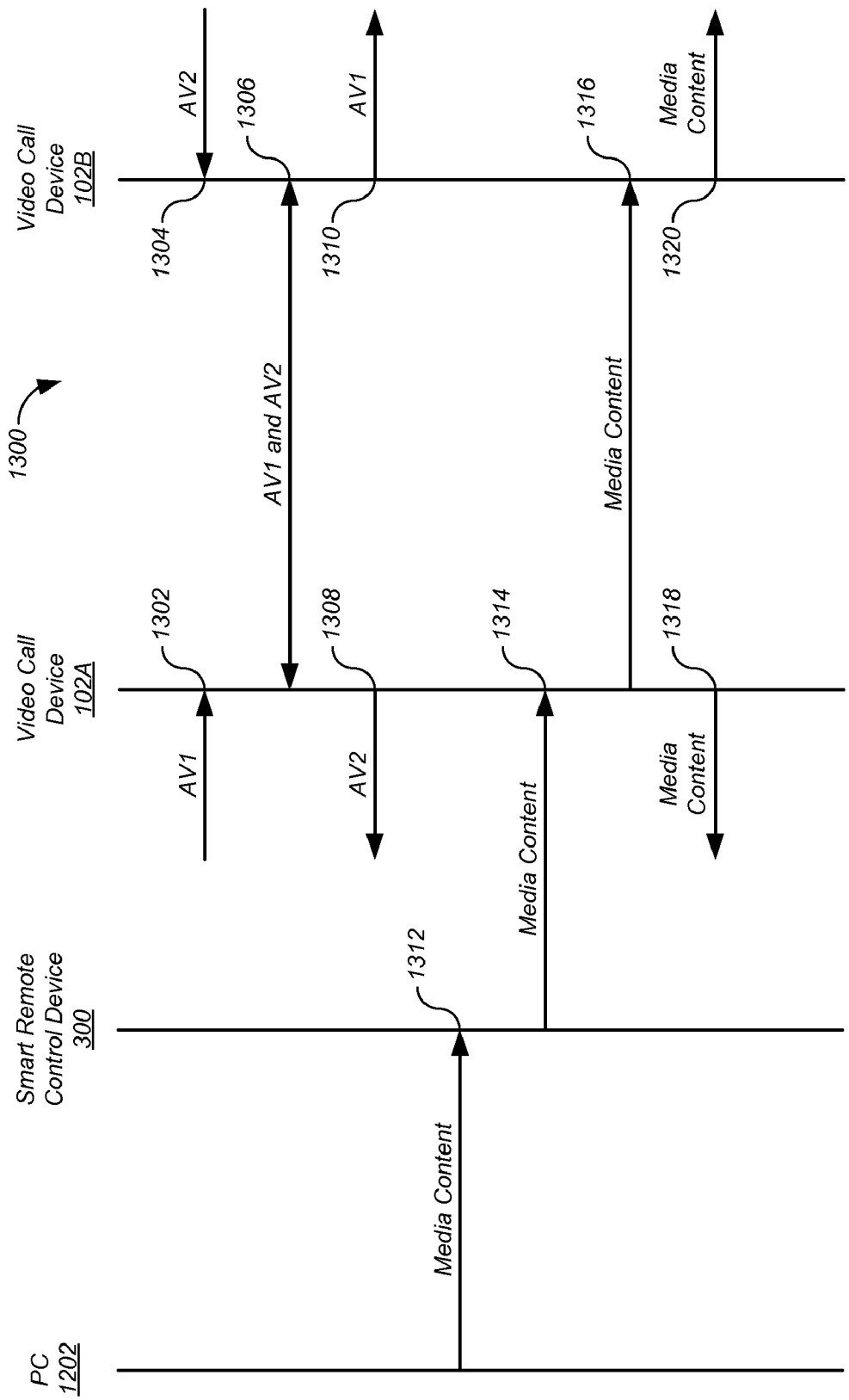
FIG. 13 shows a process for the video calling system of FIG. 12 according to an embodiment where a smart remote control device acts as a media broker for a first video call device during a video call with a second video call device.

FIG. 13 shows a process 1300 for the video calling system 1200 of FIG. 12 according to an embodiment where a smart remote control device 300 acts as a media broker for a first video call device 102A during a video call with a second video call device 102B. Although in the described embodiments the elements of process 1300 are presented in one arrangement, other embodiments may feature other arrangements. For example, in various embodiments, some or all of the elements of process 1300 can be executed in a different order, concurrently, and the like. Also some elements of process 1300 may not be performed, and may not be executed immediately after each other. For clarity, only one smart remote control device 300 and two video call devices 102A,B are shown in FIG. 13. However, it should be understood that more than one smart remote control device 300, and/or more than two video call devices 102, can participate in process 1300. In addition, while in the embodiment of FIG. 13 the smart remote control device 300 acts as a media broker during a video call, it should be understood that the smart remote control device 300 can act as a media broker outside of a video call as well. Furthermore, while in the embodiment of FIG. 13 the smart remote control device 300 obtains the media content to be brokered from a PC 1202, it should be understood that the smart remote control device 300 can obtain the media content to be brokered from any device capable of providing the media content.

Referring to FIG. 13, the video call devices 102A,B conduct a video call. In particular, the first video call device 102A receives first audio information and first video information AV1 at 1302, for example from a local camera 232 and microphone 234. The second video call device 102B receives second audio information and second video information AV2 at 1304. The video call devices 102A,B exchange the first and second audio and video information AV1 and AV2 at 1306. The first video call device 102A renders the second audio and video information AV2 at 1308, for example on television set 106A. The second video call device 102B renders the first audio and video information AV1 at 1310, for example on television set 106B. This exchange can continue for the remainder of process 1300.

At 1312, the smart remote control device 300 obtains the media content from PC 1202. The media content can be any sort of media content. At 1314, the smart remote control device 300 sends the media content to the first video call device 102A. At 1316, the first video call device 102A sends the media content to the second video call device 102B. While the media content is being transferred, the displays at both ends of the video call can show the status of the transfer.

The video call devices 102 render the media content. In particular, video call device 102A renders the media content at 1318, and video call device 102B renders the media content at 1320. In some embodiments, the rendering of the media content is synchronized, for example through the exchange of synchronization commands, so that the video call devices 102 render the media content at the same time. Such synchronization is described in U.S. Provisional Patent Application Ser. No. 61/485,229 entitled "MEDIA SHARING DURING A VIDEO CALL," filed May 12, 2011, and U.S. patent application Ser. No. (to be assigned), entitled "MEDIA SHARING DURING A VIDEO CALL," filed TBD, the disclosures thereof incorporated by reference herein in their entirety.

It should be understood that media content can be brokered from any device capable of supplying the media content to a smart remote control device 300. The media content can be supplied to a smart remote control device 300 by any means, for example by a direct wired or wireless link, as shown in FIG. 12, by a wired or wireless network, and the like. The media content can include any sort of media content, for example including a desktop, an application display, or the like. Sharing media content during a video call is disclosed in U.S. Provisional Patent Application Ser. No. 61/485,229 entitled "MEDIA SHARING DURING A VIDEO CALL," filed May 12, 2011, and U.S. patent application Ser. No. (to be assigned), entitled "MEDIA SHARING DURING A VIDEO CALL," filed TBD, the disclosures thereof incorporated by reference herein in their entirety.

Current video conferencing solutions do not allow for indirect media streams to pass through a constellation of networked devices. In contrast, as media content brokers, the described smart remote control devices 300 can manage such media streams to allow indirect, and offline, configuration and management separate from the video call device 102. Devices and streams that can be managed by the smart remote control device 300 include wireless microphones, wireless cameras, screen sharing of the displays of smart remote control devices 300, and screen sharing of a network desktop and/or application. A wireless microphone can be shared, for example, by using the on-board microphone 310 of a smart remote control device 300 or by leveraging other wireless microphone arrays, and unifying the feeds to a video call device 102. A wireless camera can be shared, for example, by using the on-board camera 306 of the smart remote control device 300 or by leveraging other wireless cameras (for example on other smart remote control devices 300) and unifying the feeds to a video call device 102. The smart remote control devices 300 can also broker media content from other smart remote control devices 300 and other video call devices 102. The smart remote control devices 300 can also perform media transcoding to match video call device 102 resources if necessary, thereby relieving the video call device 102 of the processing burden.

Embodiments of the disclosure can be implemented in digital electronic circuitry, or in computer hardware, firmware, software, or in combinations of them. Embodiments of the disclosure can be implemented in a computer program product tangibly embodied in a machine-readable storage device for execution by a programmable processor; and method steps of the disclosure can be performed by a programmable processor executing a program of instructions to perform functions of the disclosure by operating on input data and generating output. The disclosure can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the disclosure have been described. Nevertheless, it will be understood that various modifications may be made without departing from the spirit and scope of the disclosure. Accordingly, other implementations are within the scope of the following claims.

What is claimed is:

1. An apparatus comprising:
   a transmitter configured to transmit first wireless signals to a video call device, wherein the video call device has a plurality of operating states;
   a receiver configured to receive second wireless signals from the video call device, wherein the second wireless signals include contextual information describing a current one of the operating states of the video call device; and a user interface configured to display an indication of the current one of the operating states of the video call device.

2. The apparatus of claim 1, wherein:
the indication of the current one of the operating states of the video call device includes an indication of one or more commands associated with the current one of the operating states of the video call device;
the user interface is further configured to allow user selection of the one or more commands; and
responsive to the user selection of one of the commands, the transmitter is further configured to include an indication of the one of the commands in the first wireless signals.

3. The apparatus of claim 1, further comprising:
a processor configured to provide media content to the transmitter;
wherein, responsive to the processor providing media content to the transmitter, the transmitter is further configured to include the media content in the first wireless signals.

4. The apparatus of claim 3, further comprising at least one of:
a memory configured to store the media content; and
one or more input devices configured to generate the media content.

5. The apparatus of claim 3, wherein:
the receiver is further configured to receive third wireless signals from a wireless device, wherein the third wireless signals include the media content.

6. The apparatus of claim 3, wherein the media content comprises at least one of:
audio;
video; and
an image.

7. A wireless electronic device comprising the apparatus of claim 1.

8. The wireless electronic device of claim 7, wherein the wireless electronic device comprises at least one of:
a smartphone;
a feature phone;
a tablet computer;
a general-purpose computer; and
a special-purpose computer.

9. A method comprising:
transmitting first wireless signals to a video call device, wherein the video call device has a plurality of operating states;
receiving second wireless signals from the video call device, wherein the second wireless signals include contextual information describing a current one of the operating states of the video call device; and
displaying an indication of the current one of the operating states of the video call device.

10. The method of claim 9, wherein:
the indication of the current one of the operating states of the video call device includes an indication of one or more commands associated with the current one of the operating states of the video call device;
the method further comprises allowing user selection of the one or more commands; and
the method further comprises including an indication of one of the commands in the first wireless signals responsive to the user selection of the one of the commands.

11. The method of claim 9, further comprising:
including the media content in the first wireless signals.

12. The method of claim 11, further comprising at least one of:
storing the media content; and
generating the media content.

13. The method of claim 11, further comprising:
receiving third wireless signals from a wireless device, wherein the third wireless signals include the media content.

14. The method of claim 11, wherein the media content comprises at least one of:
audio;
video; and
an image.

15. Non-transitory computer-readable media embodying instructions executable by a computer to perform functions comprising:
causing transmission of first wireless signals to a video call device, wherein the video call device has a plurality of operating states; and
responsive to receiving second wireless signals from the video call device, wherein the second wireless signals include contextual information describing a current one of the operating states of the video call device, displaying an indication of the current one of the operating states of the video call device.

16. The non-transitory computer-readable media of claim 15, wherein:
the indication of the current one of the operating states of the video call device includes an indication of one or more commands associated with the current one of the operating states of the video call device;
the functions further comprise allowing user selection of the one or more commands; and
the functions further comprise including an indication of one of the commands in the first wireless signals responsive to the user selection of the one of the commands.

17. The non-transitory computer-readable media of claim 15, wherein the functions further comprise:
including the media content in the first wireless signals.

18. The non-transitory computer-readable media of claim 17, wherein the functions further comprise at least one of:
storing the media content; and
generating the media content.

19. The non-transitory computer-readable media of claim 17, further comprising:
receiving the media content, wherein the media content is included in a third wireless signal sent by a wireless device.

20. The non-transitory computer-readable media of claim 17, wherein the media content comprises at least one of:
audio;
video; and
an image.

* * * * *